(No Model.) 2 Sheets—Sheet 1.
A. B. LANDIS.
SCREW CUTTING HEAD.
No. 409,208. Patented Aug. 20, 1889.
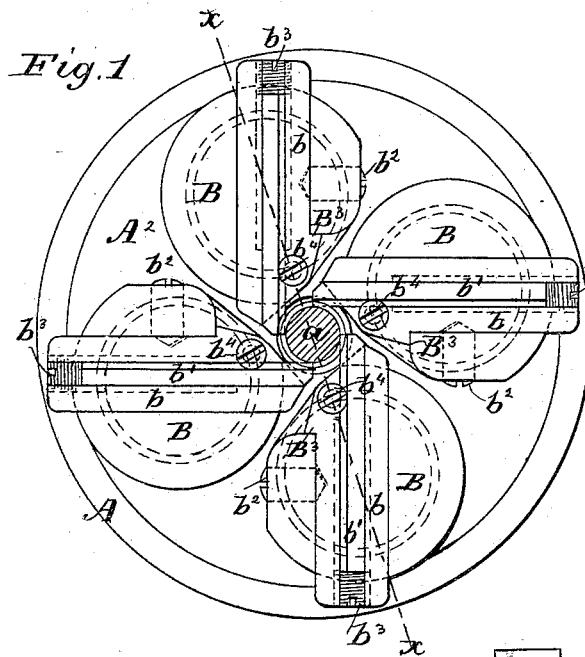
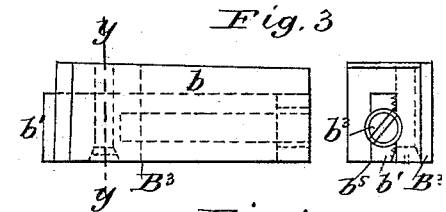
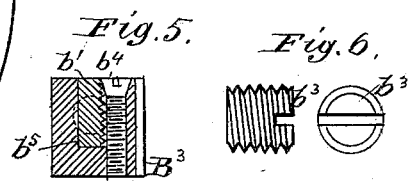
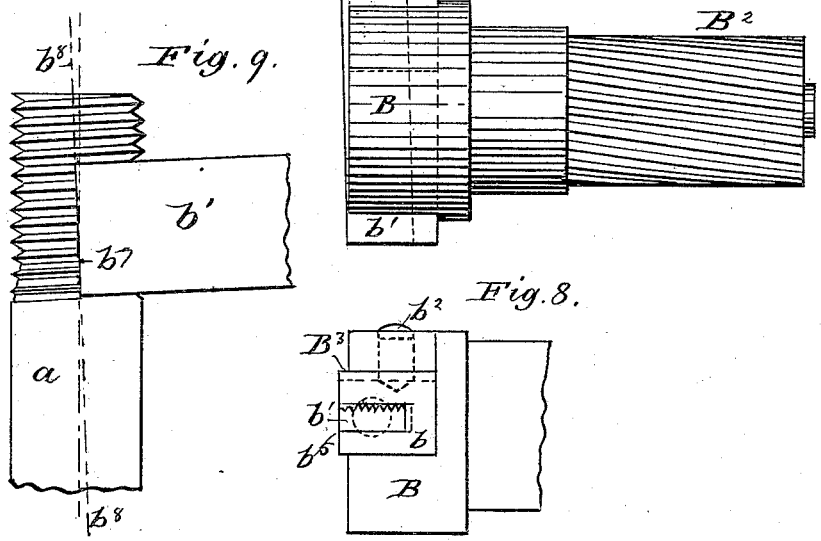
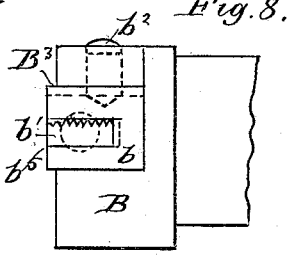
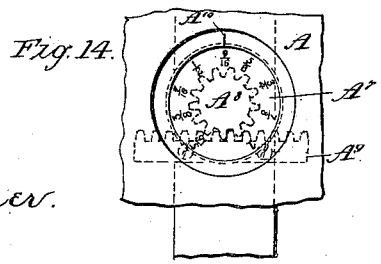
WITNESSES:
Harry L. Amer.
I. J. Masson
INVENTOR
Abraham B. Landis
BY
E. E. Masson
ATTORNEY (No Model.) 2 Sheets—Sheet 2.
A. B. LANDIS.
SCREW CUTTING HEAD.
No. 409,208. Patented Aug. 20, 1889.
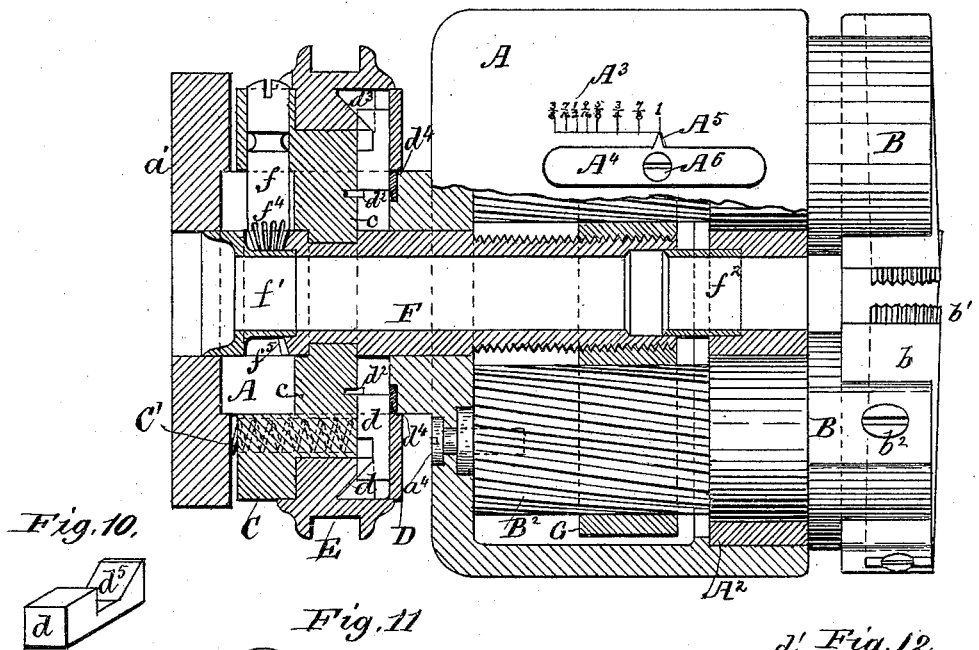
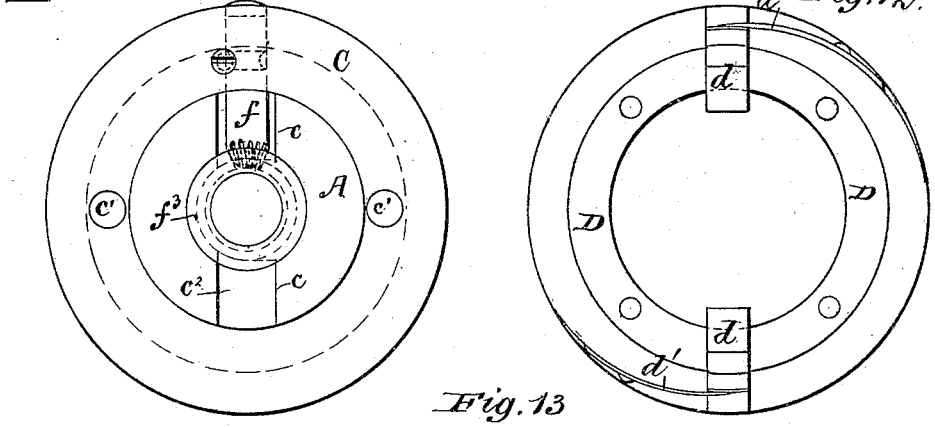
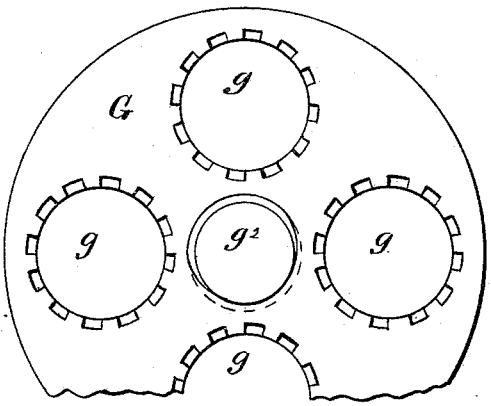
WITNESSES:
Harry L. Amer.
I. J. Masson
INVENTOR
Abraham B. Landis.
BY E. E. Masson
ATTORNEY

UNITED STATES PATENT OFFICE.

ABRAHAM B. LANDIS, OF WAYNESBOROUGH, PENNSYLVANIA.

SCREW-CUTTING HEAD.

SPECIFICATION forming part of Letters Patent No. 409,208, dated August 20, 1889.

Application filed May 14, 1889. Serial No. 310,692. (No model.)

*To all whom it may concern:*

Be it known that I, ABRAHAM B. LANDIS, a citizen of the United States, residing at Waynesborough, in the county of Franklin, State of Pennsylvania, have invented certain new and useful Improvements in Screw-Cutting Heads, of which the following is a specification, reference being had therein to the accompanying drawings.

My invention relates to improvements in screw-cutting heads in which one or more cutters are mounted in rotatable holders; and the objects of my improvement are to obtain a screw-cutting head in which all its working parts are protected against the admission of cuttings or dirt therein, which would materially affect the accuracy of the screw-thread produced upon various sizes of bolts and also increase the wear on the machine; second, the objects are to obtain ready and positive means to operate on a pointer and the latter on a scale to indicate the diameter of the screw cut by the cutter-head at the point set; third, to secure the cutter-holders so as to be rapidly changed from one size to the other; fourth, to permit the use of a cutter equal in length to nearly half of the diameter of the head; fifth, to produce a cutting-head in which the cutters project beyond the front or face thereof to enable it to cut close to the head of bolts when required. I attain these objects by the construction illustrated in the accompanying drawings, in which—

Figure 1 represents a face or end view of a die-head constructed in accordance with my invention and showing the cutter-holders with the cutter in position to operate upon a screw-blank. Fig. 2 is a side view of said die-head, partly in section, on line $x\, x$ of Fig. 1. Fig. 3 represents in side view and end view the holder or block with the cutter secured therein. Fig. 4 represents one of the cutters having a grooved face which corresponds with the thread to be cut upon a blank. Fig. 5 represents a cross-section of the cutter and holder on line $y\, y$ of Fig. 3. Fig. 6 represents an enlarged view of the small screw for the end adjustment of the cutter in the block or holder. Fig. 7 represents one of the spirally-grooved studs having a head with the cutter-holder held therein. Fig. 8 is a side view of the head of the stud, showing an end view of the cutter-holder therein. Fig. 9 shows the position of one of the cutters and its beveled ground edge on a blank to be cut. Fig. 10 represents one of the two locking-blocks to hold the cutters in a closed position. Fig. 11 is a side view of the ring or collar $c$, which actuates the cutter closing and opening mechanism. Fig. 12 is a front view of a ring D for retaining the grooved clutch-ring E in position and providing means for guiding the two locking-blocks. Fig. 13 shows the face view of a nut having four spirally-grooved holes to slide over the spiral grooves of the studs. Fig. 14 is a modification of the scale of sizes.

The die-head A is to be secured to the spindle of any bolt-cutting machine by means of bolts inserted in the flange $a'$, (shown in Fig. 2,) or other suitable means, and is made hollow its entire length, so as to permit of any length of screw to be cut.

The cutters $b'$, preferably four in number, are secured into blocks $b$. (Shown in face view in Fig. 1 and in side and end view in Fig. 3.) In each block is cut a groove $b^5$ through its entire length. The bottom of said groove is on an incline to correspond with the angle or pitch of the thread. A portion of the sides of this groove is screw-threaded to receive the short screw $b^3$, enlarged in Fig. 6. The object of this arrangement is to secure a chaser or cutter nearly equal in length to half the diameter of the head without any projection beyond the periphery of the head, and thus the cutter will give long service, because it is longer than usual. By this means I dispense with the large projecting screw heretofore used for this purpose and admit of the use of a very short screw adapted for a long adjustment by means of a screw-driver. In Fig. 5 a screw $b^4$ is shown having a conical head corresponding with the taper of the cutting portion of the cutter $b'$, for the purpose of securing the cutter firmly to the bottom of the slot, as well as against the side of the groove that supports the cutter when at work. This taper head bears against the edge of the cutter having the shortest cutting-teeth. After the cutters have been ground upon their ends the screws $b^4$ are released and the cutters pushed forward by the screws $b^3$ until the cutters need sharpening again, and the operation is repeated until they are nearly entirely used. The block $b$ fits into a groove on the head B of the stud $B^2$ and has a shoulder $B^3$ to retain it in position lengthwise, while the screw $b^2$ secures it laterally, the point of said screw engaging a countersink in the block $b$, and as said countersink is slightly on one side of the point of the screw the latter thrusts the block firmly against the bottom of the groove and its shoulder $B^3$ against the head B of the stud.

In Fig. 2 is shown the arrangement of the studs $B^2$ of Fig. 7. These studs have spiral grooves on their periphery for engagement with spirally-grooved holes $g$ in the nut G, Fig. 13. It is obvious that one spiral groove only could be used with a corresponding single rib stud without departing from the spirit of my invention; but it is preferable to use a number of them to increase the wearing-surface of the parts and materially strengthen the stud, as it will be noticed that with heavy studs and a number of slow spiral grooves the heads will be held in firm position to the work without causing a very great end-thrust on either the nut G or the studs B. Consequently they will be easily retained in position during work.

The collar C has internally-extending lugs $c$ $c$, which engage, through slots $c^2$ in the shank of the head A, with a circumferential groove $f^3$ on a central sleeve or tube F, which is screw-threaded at the end where it engages in a central screw-threaded hole $g^2$ in the nut G. Now by moving the collar C longitudinally on the hub of the head A this sleeve moves the nut G over the spirally-grooved studs $B^2$ and simultaneously rotates them. This partial rotation opens the die for the release of the screw operated upon. For obtaining a neat adjustment of the size of screw to be cut I provide a small bevel-pinion $f^4$, formed on the end of a small spindle $f$, which pinion engages with a bevel-toothed portion or wheel $f^5$ on the sleeve F. By turning this screw-threaded sleeve F the desired end is accomplished. This screw-threaded sleeve is also used for changing the position of the nut G for setting the studs $B^2$ in correct position for the cutting of different-sized screws. This correct position is indicated by a scale $A^3$ on the head A. A screw $A^6$, attached to the nut G, is made to project through a slot in the side of said head. The slot is covered by the plate $A^4$, (which plate is for the purpose of excluding any cuttings or dirt from the internal parts.) Said plate has a point $A^5$ to indicate the true position of the nut G along the scale of sizes $A^3$. A sleeve $f^2$ is secured into the central opening of the end plate $A^2$ of the head A and fits internally within the sleeve or tube F, and said sleeve is adapted to slide therein longitudinally. The purpose of said sleeve is to exclude all dirt and cuttings from the internal working parts. A sleeve $f'$ is secured to the opposite end of the sleeve F and slides with it, covers the bevel-gearing, and is also for the purpose of excluding dirt.

The collar C is held in position when the cutters are closed in position for cutting a screw by the radial locking-blocks $d$ (shown in Figs. 2 and 10) engaging with the end of the slots $c^2$ in the hub of head A against steel plates $d^4$. To disengage the blocks from said slot to open the die, the ring E, which is capable of a lateral movement, is pressed toward the head A by a yoke or other suitable means, and the beveled surface $d^3$ of said ring engages with the inclines $d^5$ of the locking-blocks $d$ and forces them outward until they become disengaged from the ends of the slots $c^2$ of the hub of the head A, and allows the collar C to move toward the head A, and consequently the nut G, which turns the studs by means of the spirals thereon and opens the die. Springs $d'$ $d'$ force the locking-blocks inwardly in said slot again as soon as the collar C is again moved back.

A pin $d^2$ on each internally-projecting lug $c$ of the collar C prevents the locking-block $d$ from going in too far. Two or more springs are used in holes $c'$ of the collar C, Fig. 11, for the purpose of bringing the locking-blocks positively against the end of the slots. The ring E is flanged over at both edges to prevent any ingress of dirt in any of the working parts, and to prevent the escape of the studs $B^2$ from the head A each one is retained by a screw $a^4$, inserted in the end thereof.

In Fig. 9 the ground front edge of the cutter $b'$ is shown beveled. In other words, it is on a line $b^8$, which forms an angle with the axis-line of the bolt, and when in use the cutting-edge is adjusted over the axis of the bolt at the point $b^7$, this being the point where the depth of the thread begins to diminish. By thus beveling the end of the cutter a good bearing is obtained upon the bolt and its vibration between the dies is prevented, a good leader for the thread is obtained, the use of a guide or support in front of the head is dispensed with, and a perfectly-cylindrical screw is obtained in place of one "out of round."

In the modified form of scale shown in Fig. 14 said scale is marked on a circular dial $A^7$, that is inserted in the side of the head A, and said dial has a pinion $A^8$ attached to the under side thereof or integral therewith, which passes through the shell of the head and engages with a rack $A^9$, secured to the nut G. The dial $A^7$ has graduations marked around its edge which correspond with the size of bolts to be cut when it coincides with the line $A^{10}$ marked on the frame or inclosure of the dial, and no projection need to extend beyond the peripheral surface.

Having now fully described my invention, I claim—

1. In a screw-cutting head, the combination of a series of rotatable studs, a block secured in the head of each stud, a cutter adjustably secured in said block, a nut in engagement with the series of studs, and a screw-threaded sleeve in engagement with the center of said nut, substantially as described.

2. In a screw-cutting head, the combination of a series of rotatable studs, a block secured in the head of each stud, a cutter adjustably secured in said block, and a nut in engagement with a series of studs, substantially as described.

3. In a screw-cutting head, the combination of a longitudinally-slotted block and cutter therein, the slot in said block being screw-tapped, with a screw $b^3$ in said screw-tapped slot, substantially as and for the purpose described.

4. In a screw-cutting head, the combination of a longitudinally-slotted block and cutter therein, the slot in said block being screw-tapped for the reception of screw, with a screw $b^3$ and a screw $b^4$, inserted in said block alongside of the cutter, substantially as and for the purpose described.

5. In a screw-cutting head, the combination of a rotatable stud, a longitudinally-slotted block secured in the head of said stud, a cutter within the slot of said block, and a short screw $b^3$, inserted in the slot of the block in the rear of the cutter, the groove in said block being screw-tapped for its reception, substantially as described.

6. In a screw-cutting head, the combination of a rotatable stud, a longitudinally-slotted block secured in the head of said stud, a cutter within the slot of said block, a screw $b^4$, inserted in said block alongside of the cutter, and a screw $b^3$, inserted in the screw-tapped slot of the block, substantially as and for the purpose described.

7. In a screw-cutting head, the combination of a rotatable stud, a longitudinally-slotted block in the head of said stud and having a shoulder $B^3$ on one side and screw $b^2$ also in one side, a cutter within the slot of said block, a screw $b^4$, inserted in said block alongside of the cutter, and a screw $b^3$, inserted in the screw-tapped slot of the block, substantially as and for the purpose described.

8. In a screw-cutting head, the combination of a series of rotatable spirally-grooved studs carrying cutters adjustably secured therein, and a nut in engagement with a series of studs and carrying a rack attached thereto and engaging with a pinion attached to the circular graduated dial on the periphery of the head, substantially as and for the purpose described.

9. In a screw-cutting head, the combination of a series of rotatable spirally-grooved studs carrying cutters adjustably secured therein, a nut in engagement with the series of studs, a screw-threaded sleeve in engagement with the center of said nut, a bevel-tooth wheel upon one end of said sleeve, and a bevel-pinion $f^4$, meshing therewith and having a spindle extending to the periphery of the head, substantially as and for the purpose described.

10. In a screw-cutting head, the combination of a series of rotatable spirally-grooved studs carrying cutters adjustably secured therein, a nut in engagement with the series of studs, a screw-threaded sleeve in engagement with the center of said nut and having a groove cut in its periphery, a collar C in engagement with said groove, and a ring E, mounted upon said collar and capable of lateral movement, substantially as and for the purpose described.

11. In a screw-cutting head, the combination of a series of rotatable spirally-grooved studs carrying cutters adjustably secured therein, a nut in engagement with the series of studs, a screw-threaded sleeve in engagement with the center of said nut and having a groove cut in its periphery, a collar C in engagement with said groove, and a ring E, mounted upon said collar and capable of lateral movement and provided with a beveled surface $d^3$, with the radial locking-blocks $d$, having inclines $d^5$, substantially as and for the purpose described.

12. In a screw-cutting head, the combination of a longitudinally-slotted block having the bottom thereof tapering in thickness, a cutter secured within said block with its cutting end projecting beyond the end of the block, and said cutting end ground to form with the axis of the cutting-head an angle, as with line $b^8$, substantially as and for the purpose described.

In testimony whereof I affix my signature in presence of two witnesses.

ABRAHAM B. LANDIS.

Witnesses:
 GEO. H. RUSSELL,
 JNO. B. RUSSELL.